United States Patent [19]

Dissett

[11] Patent Number: 4,677,876
[45] Date of Patent: Jul. 7, 1987

[54] TORQUE-PROPORTIONING DIFFERENTIAL WITH CYLINDRICAL SPACER

[75] Inventor: Walter L. Dissett, Southfield, Mich.

[73] Assignee: Tractech, Inc., Warren, Mich.

[21] Appl. No.: 579,712

[22] Filed: Feb. 13, 1984

[51] Int. Cl.[4] .............................................. F16H 1/38
[52] U.S. Cl. ........................................ 74/715; 74/607
[58] Field of Search ................ 74/711, 714, 715, 607, 74/606 R; 384/907

[56] References Cited

U.S. PATENT DOCUMENTS

| | | | |
|---|---|---|---|
| 1,352,910 | 9/1920 | Ormsby | 74/715 |
| 2,000,223 | 5/1935 | DuPras | 74/715 |
| 2,462,000 | 2/1949 | Randall | 74/715 |
| 2,972,265 | 2/1961 | Walter | 74/715 |
| 3,095,761 | 7/1963 | Hilado | 74/715 |
| 3,706,239 | 12/1972 | Myers | 74/715 |
| 3,874,250 | 4/1975 | Duer | 74/711 |
| 3,899,939 | 8/1975 | Hilado | 74/715 |
| 4,162,637 | 7/1979 | Altmann | 74/711 |
| 4,365,524 | 12/1982 | Dissett et al. | 74/715 |
| 4,495,835 | 1/1985 | Gleasman | 74/715 |

FOREIGN PATENT DOCUMENTS

| | | | |
|---|---|---|---|
| 617012 | 2/1961 | Canada | 74/715 |
| 1152655 | 2/1958 | France | 74/715 |
| 2215559 | 8/1974 | France . | |
| 1274298 | 4/1961 | United Kingdom . | |
| 1152635 | 5/1969 | United Kingdom . | |
| 1451358 | 9/1976 | United Kingdom . | |
| 2083145 | 3/1982 | United Kingdom . | |
| 2086498 | 5/1982 | United Kingdom . | |

Primary Examiner—Leslie Braun
Assistant Examiner—David Novais
Attorney, Agent, or Firm—Laubscher & Laubscher

[57] ABSTRACT

A gear differential is disclosed for supplying driving torque from an input shaft to a pair of aligned axially spaced output shafts, including a carrier housing driven by the input shaft and having a center section and a pair of end cover sections, a pair of side gears journalled in opposite ends of the center section for splined connection with the output shafts, respectively, and pairs of differential helical pinions having threads of opposite hands, respectively, the helical pinions of each pair being mounted with a running fit in longitudinal bores contained in opposite ends of the center section for threaded engagement with the side gears, respectively, the adjacent ends of the helical pinions being in overlapping enmeshing threaded engagement, characterized by the provision of a spacer cross pin member having a cylindrical shank portion extending transversely between, and for contiguous engagement by, the adjacent ends of the output shafts. The end cover sections of the housing are formed from pearlitic nodular iron, the adjacent ends of the cover sections being flame or induction hardened to eliminate the thrust washers, whereby each section may be bolted by short bolts directly in contiguous engagement with the corresponding end of the center section, respectively.

2 Claims, 6 Drawing Figures

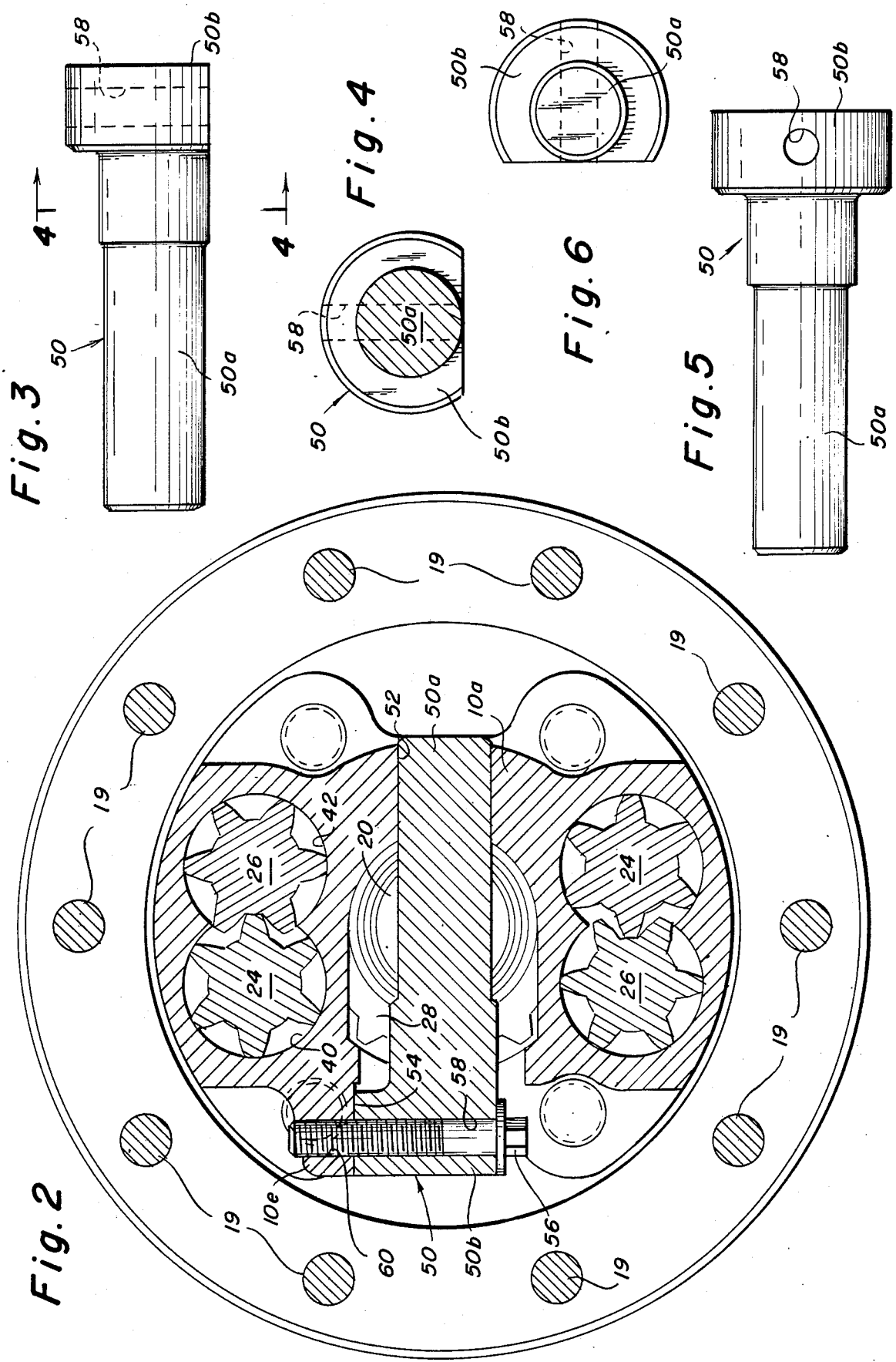

TORQUE-PROPORTIONING DIFFERENTIAL WITH CYLINDRICAL SPACER

BRIEF DESCRIPTION OF THE PRIOR ART

Torque-proportioning differentials of the helical pinion differential gear type are known in the prior art, as evidenced by the prior patents to Myers Pat. No. 3,706,239 and Dissett et al Pat. No. 4,365,524, each assigned to the same assignee as the present invention. In these known differentials, internal bias torque is produced as relative motion occurs due to the differentiating action of the mechanism. The differential carrier housing includes two sections each having pinion recesses in the form of internal cylindrical cavities parallel with the driven axle shafts. Thus, the cavities in one housing part register and align with the cavities in the other housing part so that when the parts are joined together, a single cylindrical cavity for each differential pinion is provided.

The pinion cavities are arranged in discrete pairs, one cavity of each pair intersecting the other cavity of that pair. When the pinions are mounted within their respective cavities, the pinions of each discrete pair mesh with each other. One pinion of each pair meshes in turn with one side gear, and the other meshes with the adjacent side gear. The pinions of each pair are offset axially with respect to each other. The side gears are journalled within a centrally disposed pinion opening in the differential carrier housing.

In the Dissett et al patent, a collapsible and expansible wedge block spacer assembly is provided for maintaining the output shafts in spaced relation and for reacting to axially inwardly directed thrust forces. During assembly of the differential apparatus, the spacer block is introduced, when in a collapsed condition, into the housing via a transverse access opening to a position between the output shafts, whereupon the wedge block assembly is axially expanded into supporting engagement with the adjacent ends of the output shafts.

The present invention was developed to provide an improved differential apparatus of simplified, less costly, light weight design that is stronger and more durable in operation, that positively maintains the output shafts and side gears in a desired spaced relation, and that positively supports the components against the axial thrust forces applied thereto during differential operation.

SUMMARY OF THE INVENTION

According to a primary object of the present invention, an improved differential of the torque-proportioning helical pinion differential gear type is provided including a unitary cylindrical spacer pin that is inserted between the adjacent ends of the output shafts, thereby to support the same against axially inwardly directed thrust forces. The spacer pin includes a cylindrical portion that extends through a corresponding centrally arranged transverse bore contained in the differential housing, and a cylindrical enlarged head portion that is received in a corresponding counterbored recess. A retaining screw or bolt member extends through a diametrically arranged transverse passage contained in the enlarged head portion, said retaining member being threadably received at one end in a corresponding threaded bore formed in the lug provided on the housing. The new design allows the side gears to thrust into the center case body rather than on the wedge block assembly of the aforementioned Dissett et al patent. Improved tolerances can be achieved with the new design with a substantial cost savings. In addition, the final installation of the differential assembly into the axle assembly is much simpler with a substantial time savings. The new cross pin spacer serves only one function—namely, as an axle spacer (as distinguished from the prior wedge block spacers, which also had to serve as a bearing face for the side gears when they were axially thrusted inward).

A further object of the invention is to provide a torque-proportioning differential of the helical pinion type wherein the housing includes a central section and a pair of end cover sections bolted thereto, the use of thrust washers being avoided. To this end, at least the end cover sections are formed of pearlitic nodular iron the adjacent end surfaces of which are flame or induction hardened for direct contiguous engagement with the corresponding end faces of the center housing section, respectively. This change not only enables the elimination of the thrust washers once required for a good wear surface to support the axial thrust forces of the pinion and side gears, but also permits considerable cost savings, as well as the lengthening of the pinion and side gears for additional load capacity.

Another object of the invention is to provide a differential in which relatively short bolts are used to fasten each end cover section to the center section of the housing. This eliminates the need for close tolerance, in-line holes in the case body, and allows a larger tolerance clearance hole location in each cover. It also allows the differential assembly time to be greatly reduced with attendant substantial cost savings.

BRIEF DESCRIPTION OF THE DRAWING

Other objects and advantages of the invention will become apparent from a study of the following specification when viewed in the light of the accompanying drawing, in which:

FIG. 2 is a sectional view taken along line 2—2 of FIG. 1;

FIG. 3 is a side elevational view of the cylindrical spacer pin of the present invention;

FIG. 4 is a sectional view taken along line 4—4 of FIG. 3; and

FIGS. 5 and 6 are top plan and end views, respectively, of the cylindrical spacer pin.

DETAILED DESCRIPTION

Figure 1:
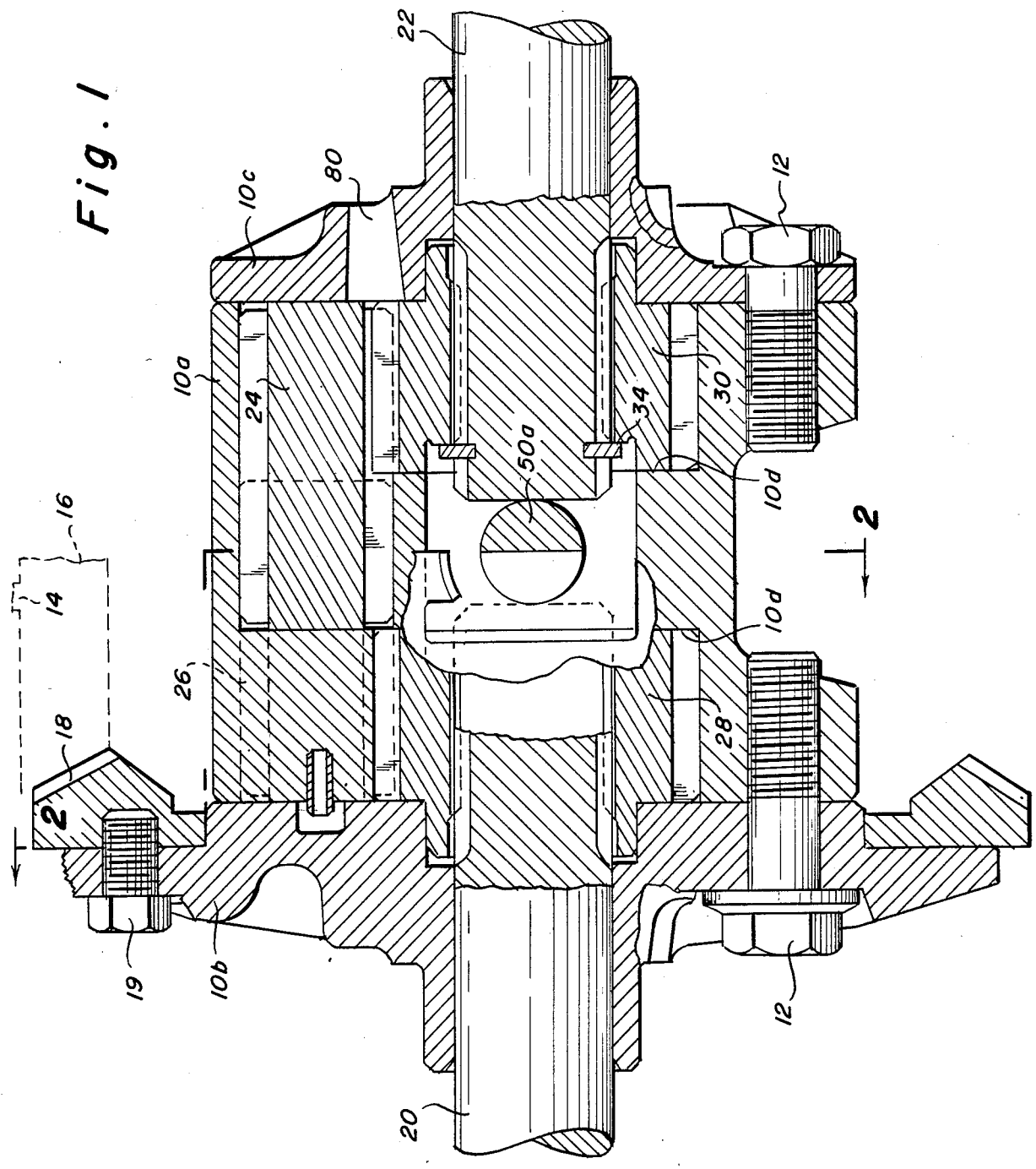
FIG. 1 is a longitudinal sectional view of the helical gear differential apparatus of the present invention.

Referring first more particularly to FIGS. 1 and 2, the differential housing 10 includes a center section 10a, a flanged end cover section 10b, and a plain end cover section 10c, each of the end cover sections being rigidly connected with the center section, respectively, by relatively short bolts 12. In accordance with an important feature of the invention, the end cover members are formed of pearlitic nodular iron and have adjacent surfaces that are flame or induction hardened, whereby the cover members may be bolted directly in contiguous engagement with the end surfaces of the center section, whereby the use of conventional thrust washers may be eliminated. The center section 10a may be formed of ferritic nodular iron or of pearlitic nodular iron or steel. In the latter case, the wear surfaces of the center section may be flame or induction hardened, if desired. As will be described in greater detail below, the hardened adjacent surfaces of the end cover members 10b and 10c support the end surfaces of the helical differential pinions 24 and 26, and the remote end surfaces of the side gears 28 and 30, respectively.

The differential carrier housing 10 is rotatably driven from the drive shaft 14 via driving pinion 16 and ring gear 18 bolted to the housing by bolts 19, to normally drive output shafts 20 and 22 via pairs of cooperating left and right hand helical pinion gears 24 and 26, repectively, and side gears 28 and 30 non-rotatably splined on the output shafts 20 and 22, respectively. Outward displacement of the output shafts 20 and 22 relative to the side gears 28 and 30, respectively, is prevented by C-shaped lock members 34 that resiliently retained in corresponding grooves formed within the splined end portions of the output shafts.

The pinions 24 and 26 are freely rotatably mounted within corresponding longitudinal bores 40 and 42 contained in opposite ends of the central body portion 10a, respectively, which bores are in communication at their adjacent ends, thereby to permit enmeshing engagement between the adjacent end portions of the helical pinion gears 24 and 26. The side gears 28 and 30 are rotatably mounted with corresponding bores formed in opposite ends of the central body portion. The helical pinion gears 24 and 26 have helical gear teeth of right and left hand thread, respectively, each gear normally having eight helical teeth with a pressure angle of about 30° and helix angle of about 40° (as disclosed in the aforementioned Dissett et al Pat. No. 4,365,524).

In accordance with another characterizing feature of the invention, a cylindrical transverse spacer pin 50 is provided that extends transversely of the center housing section between the adjacent ends of the output shafts 20 and 22 for maintaining the same in an axially spaced condition. More particularly, as shown in FIG. 2, the spacer pin 50 includes at one end a cylindrical spacer pin portion 50a that extends through a corresponding centrally arranged transverse bore 52 formed in the center housing section 10a. At its other end the spacer pin includes an enlarged cylindrical head portion 50b that is mounted in a corresponding counterbored cylindrical recess 54 formed in the center housing section 10a. Axial displacement of the spacer pin relative to the center housing section is prevented by a retaining bolt 56 that extends through diametrically arranged passage 58 contained in the enlarged head portion 50b of the spacer pin, and through corresponding aligned passage 60 contained in spaced external lug portion 10e on the center housing section.

OPERATION

Assume that the side gears 28 and 30 are splined to output shafts 20 and 22, respectively, and that the C-shaped locking members 34 are positioned into the circumferential grooves formed in the output shafts. After the ring gear 18 is bolted by bolts 19 to the flange portion of cover section 10b, the spacer pin is introduced into passage 52 and counterbore 54 as shown in FIG. 2, the adjacent ends of the output shafts being in engagement with the cylindrical end portion 50a of the spacer pin. The retaining pin is mounted in the diametrically arranged through passage 58 and the passage 60 in the lug of the center housing section, thereby to lock the spacer pin in its operative position shown in FIG. 2.

Upon rotation of the drive shaft 14, output shafts 20 and 22 are normally driven at the same speed via drive pinion 16, ring gear 18, housing 10, helical pinion gears 24 and 26, and side gears 28 and 30. Thus, the drive torque applied to ring gear 18 is distributed through two parallel torque delivery paths which include the meshing pairs of differential pinions 24 and 26, thereby introduces radial gear tooth loading on the pinions, which results in frictional resistance owing to rotation, thus introducing an inherent bias torque. Because of the helix angle on the pinions 24 and 26 and on the companion side gears, a thrust force is produced on the pinions causing frictional resistance owing to the engagement of the pinions with the ends of their respective pinion cavities. Thrust forces are also introduced on the end walls 10d of the side gear bores in the center housing 10a as a consequence of the axial gear tooth loading in the two side gears. Finally, a further thrust force on the pinion is produced by the axial gear tooth loads, which thrust force is transmitted directly to the adjacent hardened end surfaces of the end cover members, respectively. Thus, the hardened cover end surfaces receive the axial thrust forces of both the pinions 24 and 26 and the corresponding end surfaces of the side gears.

Under normal conditions of equal tractive effort at each tire, equal resistance force is applied by each side gear so that the pinions do not differentiate. However, when one side gear applies more resistance to the torque driving the pinion (due to dissimilar ground coefficients), its mating pinions tend to separate from the side gear and wedge into the pockets in the case. As the input torque increases, the wedging of the pinions in the case also increases. As the coefficient of friction under each of the drive wheels varies, the amount of torque distributed to each wheel is automatically proportioned so that wheel slip under the tire with the poorest traction will be controlled.

With the differential of the present invention, torque bias increases as the input torque increases. This is a desirable characteristic because at high speeds the differential sees low torque and functions like a standard differential. However, at low speeds and high torque conditions, the differential automatically biases more torque to the drive wheel that has most resistance to wheel-spinout.

The differential requires a certain amount of resistance at the ground in order to start the "biasing" action—approximately the amount developed by a light-truck tire on snow. A differential will not bias if the spinning wheel is off the ground. If the coefficient is below 0.1 or even 0 (represents a wheel off the ground), the driver simply applies the brakes lightly until enough torque resistance is developed to start biasing the differential and move the vehicle.

Suitable lubrication oil to provide a normal lubrication oil film can be introduced into the pinion and gear cavities via lubrication oil ports 80 contained in cover portions 10c and 10b.

By varying the helix angle of the gear teeth, the thrust force of the pinions to the case can be increased or decreased. By varying the pressure angle of the gear teeth, the separating force of the pinions relative to the side gears can be increased or decreased. By varying the number of pinion sets, torque capacity of the differential assembly can be increased or decreased. By varying the helix angle and pressure angle of the gear teeth, a desired torque distribution or torque bias can be obtained.

While the preferred embodiment has been illustrated and described, other changes and modifications may be made without deviating from the invention concepts set forth above.

What is claimed is:

1. Gear differential apparatus for supplying driving torque from a drive shaft to a pair of aligned axially spaced output shafts, comprising
   (a) a sectional differential carrier housing adapted to be rotatably driven by the drive shaft, said housing including a center body section, and a pair of end cover sections connected on opposite ends of said center body section, said center body section containing a central transverse bore (52) of circular cross-sectional configuration, one end of said transverse bore being enlarged to define a recess (54) on one side of said center body section;
   (b) a pair of annular helical side gears journalled in corresponding aligned bores contained in opposite ends of said center body section, respectively, said side gears having splined inner circumferences for non-rotatable connection with the output shafts when the adjacent ends of the shafts extend in axially spaced relation through aligned openings contained in said end cover sections, respectively;
   (c) a plurality of pairs of differential helical pinions having threads of opposite hands, respectively, the pinions of each pair being mounted with an outside diameter running fit within longitudinal bores contained in opposite ends of said center housing section respectively, the adjacent ends of said bores being in communication and the adjacent ends of said differential helical pinions being in overlapping enmeshing engagement with each other, said pinions having axes parallel with the axis of, and being in enmeshing engagement with, said side gears, respectively, whereby the torque transmitted through said differential mechanism introduces gear tooth loads on said pinions which cause a frictional torque resistance as the pinions rotate within their respective pinion cavities, thereby introducing a torque bias in the differential mechanism;
   (d) lock means for preventing axial displacement of the output shafts outwardly relative to the side gears, respectively; and
   (e) cross pin spacer means for maintaining the output shafts in axially spaced relation, said cross pin spacer means consisting of
      (1) a unitary cross pin having at one end a cylindrical shank portion (50a) mounted in said transverse bore for contiguous engagement by the adjacent ends of the output shafts;
      (2) said cross pin having at its other end an integral enlarged generally cylindrical head portion (50b) mounted in said recess, said recess having a cylindrical wall surface of a diameter corresponding generally with that of said enlarged head portion; and
      (3) retaining means preventing axial displacement of said cross pin relative to said housing center body section, said retaining means including a retaining member (56) that extends through a diametrically arranged passage contained in said enlarged head portion, at least one end of said retaining member extending in a corresponding opening contained in a support lug portion (10e) of said central body section adjacent said recess.

2. Gear differential apparatus for supplying driving torque from a drive shaft to a pair of aligned axially spaced output shafts, comprising
   (a) a sectional differential carrier housing adapted to be rotatably driven by the drive shaft, said housing including a center body section and a pair of end cover sections connected on opposite ends of said center body section, said center body section containing a central transverse bore (52) of circular cross-sectional configuration, one end of said transverse bore being enlarged to define a recess (54) on one side of said center body section;
   (b) a pair of annular helical side gears journalled in corresponding aligned bores contained in opposite ends of said center body section, respectively, said side gears having splined inner circumferences for non-rotatable connection with the output shafts when the adjacent ends of the shafts extend in axially spaced relation through aligned openings contained in said end cover sections, respectively;
   (c) a plurality of pairs of differential helical pinions having threads of opposite hands, respectively, the pinions of each pair being mounted with an outside diameter running fit within longitudinal bores contained in opposite ends of said center housing section, respectively, the adjacent ends of said bores being in communication and the adjacent ends of said differential helical pinions being in overlapping enmeshing engagement with each other, said pinions having axes parallel with the axis of, and being in enmeshing engagement with, said side gears, respectively, whereby the torque transmitted through said differential mechanism introduces gear tooth loads on said pinions which cause a frictional torque resistance as the pinions rotate within their respective pinion cavities, thereby introducing a torque bias in the differential mechanism;
   (d) lock means for preventing axial displacement of the output shafts outwardly relative to the side gears, respectively;
   (e) cross pin spacer means for maintaining the output shafts in axially spaced relation, said cross pin spacer means including
      (1) a unitary cross pin (50) having at one end a cylindrical shank portion (50a) mounted in said transverse bore for contiguous engagement by the adjacent ends of the output shafts;
      (2) said cross pin having at its other end an enlarged head portion (50b) mounted in said recess; and
      (3) retaining means (56) preventing axial displacement of said cross pin relative to said housing center body section;
   (f) said housing end cover sections being formed from pearlitic nodular iron, the adjacent surfaces of said cover sections being hardened for contiguous engagement with the corresponding end surfaces of said center section, respectively, said hardened cover surfaces being directly contiguously engaged by the corresponding ends of said helical pinions, respectively, thereby to receive the axial thrust forces generated thereby, respectively; and
   (g) short screw means connecting each of said cover sections with corresponding ends of said center section, respectively.

* * * * *